Feb. 8, 1955   J. E. KISSNER ET AL   2,701,591
TREE CUTTING ATTACHMENT FOR BULLDOZERS
Filed April 22, 1954
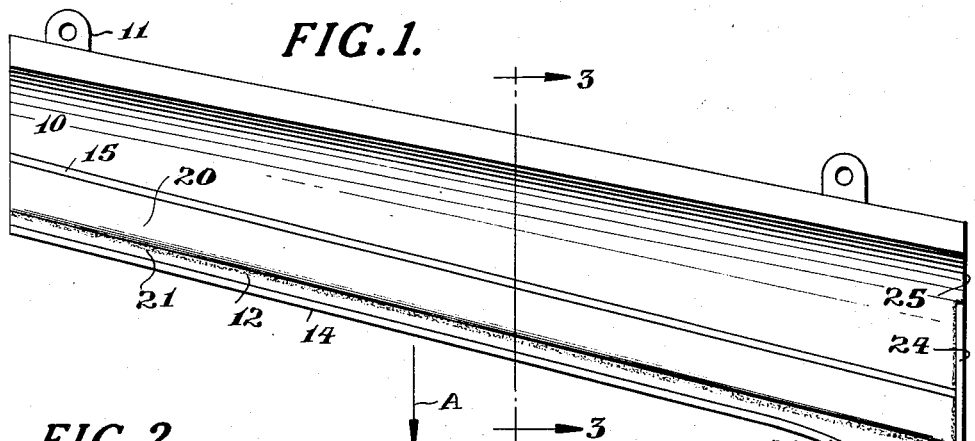
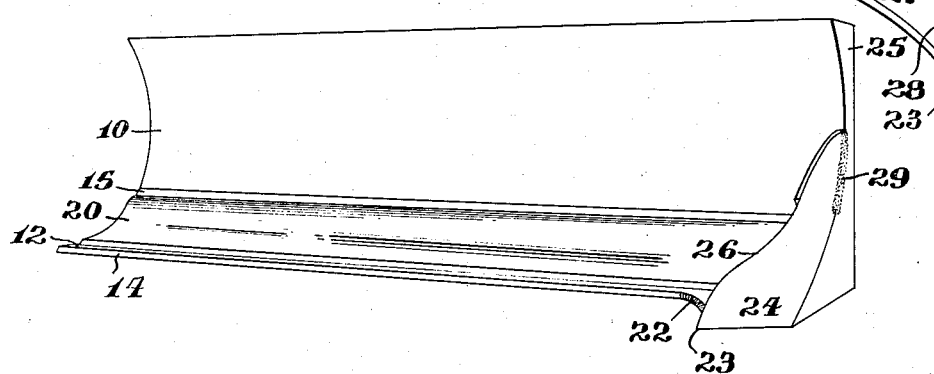
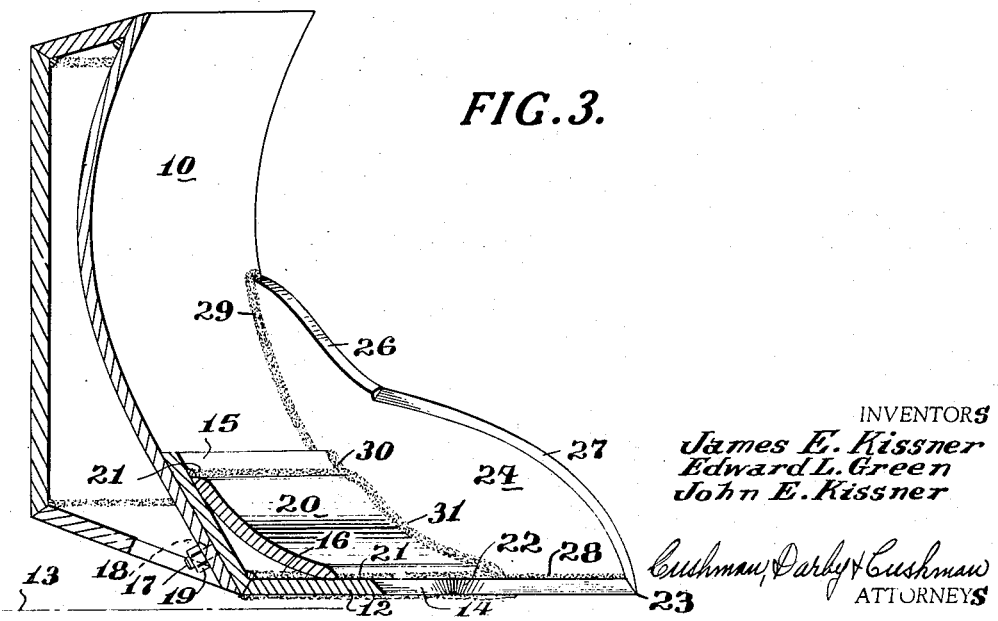
INVENTORS
James E. Kissner
Edward L. Green
John E. Kissner
Cushman, Darby & Cushman
ATTORNEYS

# United States Patent Office 2,701,591
Patented Feb. 8, 1955

2,701,591

TREE CUTTING ATTACHMENT FOR BULLDOZERS

James E. Kissner, Edward L. Green, and John E. Kissner, Lottie, La.

Application April 22, 1954, Serial No. 424,909

6 Claims. (Cl. 144—34)

This invention relates to cutting attachments for bulldozers, and particularly to means adapted for use with an angle bulldozer plate supported by a large tractor or other prime mover, for cutting trees of relatively large diameter. This invention is an improvement on the invention described and claimed in our prior United States Patent No. 2,633,164, patented March 31, 1953.

In our prior patent referred to is disclosed a cutting attachment for bulldozers, adapted to cut off at ground level brush and trees ranging in diameter up to about 15 inches. We have now invented an improvement on our prior invention, whereby the attachment is adapted to cut trees of larger diameter, up to about 36 inches and more, thereby achieving a bulldozer attachment of greatly enhanced versatility and utility. It is a principal object of the present invention, accordingly, to provide a bulldozer attachment adapted for cutting trees of large diameter. A related object is to provide a cutting attachment adapted to cut off large trees substantially at ground level, without rooting up the tree roots.

A further object of the invention is to provide a cutter adapted to cut trees of large diameter and leave the stump portions thereof in broken and split condition, whereby rotting by natural causes is facilitated.

Another object is to provide a cutting attachment for bulldozers adapted to cut trees with a slicing action, and angled to deflect the cut trees laterally to one side of the machine, thereby piling the trees and brush in windrows for ready disposal.

Still another object is to provide a brush and tree cutting bulldozer attachment of outstanding strength and durability, the component elements thereof mutually bracing each other to achieve a unitary structure adapted for severe service. Further objects will be in part obvious and in part pointed out hereinafter.

The invention and the novel features thereof may best be made clear by reference to the following description and the accompanying drawings, in which:

Figure 1 is a top plan view of an exemplary embodiment of the invention, applied to a conventional angle bulldozer blade;

Figure 2 is a perspective elevational view of the device of Figure 1, looking toward the lower right-hand corner thereof, and Figure 3 is a sectional view of the device of Figure 1, taken on the line 3—3 thereof.

Referring to the drawings in detail, there is illustrated a conventional angle bulldozer blade or plate 10, provided with rearwardly extending lugs 11. Principally by means of lugs 11, it will be understood, the bulldozer plate is adapted for mounting, through a conventional bulldozer frame and side arms (not shown), forwardly of a large tractor or similar prime mover. By means of such mounting the bulldozer plate may be vertically and otherwise adjusted, in the well known manner. In normal positional relationship, the bulldozer plate is angulated with respect to the longitudinal center line of the associated prime mover, and one end of the plate extends substantially forwardly of the other end. The normal positional relationship of the bulldozer plate is indicated in Figure 1, wherein the arrow A indicates the direction of the longitudinal axis of the prime mover and also the direction of movement thereof.

As fully described in our prior patent referred to, the bulldozer plate 10 may be provided with a bottom cutting blade 12 secured to the lower edge thereof, and projecting or extending forwardly therefrom so as to be disposed normally substantially parallel to the surface of the ground. The ground level is indicated in Figure 3 by the numeral 13. The outer or forward edge of the bottom cutting blade 12 is sharpened, preferably by means of a bevel 14 formed on the upper side thereof, to adapt the cutting blade to cut brush and trees which it may forcibly encounter. The cutting outer edge of the cutting blade 12 being angulated with respect to the direction of movement, the bulldozer plate and associated tractor upon encountering sufficient resistance may be deflected laterally, thereby exerting a slicing cutting action against the resisting object, all as described in our prior patent. Trees and brush severed by the cutting blade are displaced laterally by the bulldozer plate toward the trailing side thereof, to be windrowed alongside the path of the machine.

The bottom cutting blade 12 is conveniently associated with a similar blade or plate 15, the blade 12 and plate 15 being provided with bevelled back edges which are disposed in abutting engagement and welded together, as indicated at 16 in Figure 3, whereby the blade 12 and plate 15 are disposed at obtuse angles to one another. The plate 15, which is adapted to be disposed flush against the forward side of bulldozer plate 10 and adjacent its bottom edge, may be provided at a plurality of longitudinally spaced points with threaded studs 17 which are fixed thereto and which project from the outer side thereof through openings 18 provided in the bulldozer plate 10 near its lower edge. A nut 19 engages each stud 17 and is tightened to bear against the rear surface of the bulldozer plate for securing the plate 15 thereto, and so that the bottom cutting blade 12 will project forwardly from the bottom edge of the bulldozer plate at the desired angle. Alternatively, the plate 15 and the cutting blade may be secured to the bulldozer plate 10 by welding, or in other conventional fashion.

A reinforcing plate 20 is arced or bowed transversely from end to end thereof and is disposed between the inner sides of blade 12 and plate 15, with its concave side facing upwardly and forwardly, and is welded to said blade 12 and plate 15, as indicated at 21. The lower forward edge of reinforcing plate 20 is spaced from the forward edge of bottom cutting blade 12, that is, terminates short of the bevelled cutting edge 14 thereof. The upper rearward edge of the reinforcing plate 20 merges more or less smoothly into the front side of plate 15, whereby the reinforcing plate 20 serves not only to brace the cutting blade 12, but also to deflect severed material gradually upwardly.

The underside of cutting blade 12 may be coated with extremely hard material, or suitably treated to effect a hardening thereof, whereby the cutting blade and its forward cutting edge are adapted to withstand wear and resist dulling in service. All the structure described in the foregoing is disclosed in our prior patent referred to, and forms no part of the present invention.

As previously stated, the attachment of our prior patent is adapted to cut brush and trees up to about 15 inches in diameter, with ease and facility. We have now discovered that our prior invention may be simply but effectively modified and adapted for cutting trees of larger diameter, ranging up to 36 inches and more. For this purpose, we utilize a bottom cutting blade 12 having an outer cutting edge substantially parallel to the bulldozer plate for a major portion of its length, but curving outwardly therefrom at its leading end as at 22, and terminating in a forward point 23. Also, as a principal feature of the invention a side cutting blade 24 is provided, secured to the leading side 25 of the bulldozer plate and extending forwardly therefrom in the direction of movement, that is in the general direction of the longitudinal axis of the device and of the tractor upon which it may be mounted.

As best illustrated in Figures 2 and 3, the leading outer edge 26 of the side cutting blade 24 slopes generally downwardly and outwardly from the bulldozer plate to merge into the leading point 23 of the bottom cutting blade 12. The leading outer edge 26 where it merges into point 23 approaches the vertical, and where it merges into the bulldozer plate 10 approaches the horizontal. Intermediate these extremes, the outer edge 26 of the side cutting blade preferably is reversely curved, this configuration having been found most efficient in operation. The outer edge 26 of the side cutting blade is sharpened, preferably by a bevel 27 on the inner side thereof.

The bottom cutting blade 12 lying in a substantially horizontal plane, and the side cutting blade 24 being disposed in a substantially vertical plane, the cutting blades are disposed at right angles to each other, and meet along a common straight line. Both blades extend to the line of intersection, and are welded together therealong, as at 28. The side cutting blade 24 is also secured to the forward surface of the leading side 25 of bulldozer plate 10 by a weld 29 along the line of intersection therebetween, and successively by a weld 30 to the forward surface of the adjacent edge of plate 15, and by a weld 31 to the forward side of the adjacent edge of reinforcing plate 20. The resultant structure, tied in to both the bottom and side of the bulldozer plate, is exceedingly strong, precisely in the area where maximum stresses may be anticipated.

Operation of the device will now be described in detail. In attempting to cut a tree of large diameter, say 24 or 36 inches, forcible contact of the tree by the central section of the bottom cutting blade 12 will usually prove ineffective, the tractive force exerted against the tree resulting in little more than lateral displacement of the bulldozer attachment and the supporting tractor. This, as will appear, is the same result obtained with the cutting attachment of our prior invention. In such case, it is contemplated that the tree may be engaged adjacent a side thereof by the leading end of our modified and improved cutting attachment. In the exemplary embodiment shown in the drawings, the bulldozer plate is angulated with left side (as viewed from the rear thereof looking in the direction of movement) forward. In such case, to cut a tree of large diameter, the tree is engaged initially adjacent the right side thereof by the leading left side of the cutting attachment, that is by the leading point 23 thereof, whereupon the leading edge of the cutting attachment may be forced through or well into the tree, splintering the side thereof and removing a notch several inches deep therefrom. The notching cut is effected by the curved portion 22 of the bottom cutting blade 12 and the downwardly sloping side cutting blade 24, acting together. Leading point 23 of the attachment initially engages the tree, and as the attachment advances the adjacent portions of the cutting blades enter. The curved portion 22 of the bottom cutting blade cuts outwardly from the initial point of engagement with a slicing action, and the side cutting blade 24 splits the tree above the transverse cut, with a similar slicing action.

The bulldozer plate may then be retracted, and redirected so that point 23 will engage the tree trunk several inches to the left of, or inside of the notch previously made. Thereupon, the leading end of the attachment may again be forced through or well into the tree, to make another notch therein in the manner previously described. In this way successive notches may be cut in the tree, until the tree is completely severed or reduced to a diameter permitting cutting by the central portion of the bottom cutting blade 12.

The disposition of the bevels 14 and 27, on the upper surface and inside surface of the bottom cutting blade 12 and the side cutting blade 24 respectively, facilitates the notching action. As will be apparent, the progressive cutting of the tree by removal of successive notches therefrom breaks and splinters the trunk remaining in the ground to a considerable degree, whereby rotting thereof through natural causes is accelerated.

The improved cutting attachment is capable of functioning in the manner of our previous invention. The addition of curve 22 in the bottom cutting plate, however, combined with the provision of the side cutting blade 24 and the merging of these elements into a leading point 23 effects a novel structure of greatly increased utility, permitting the cutting of very large trees in the manner described, as well. The greatly enhanced structural strength of the improved attachment also results in improved functioning and wider utility.

It will thus be seen that there has been provided by this invention a structure in which the various objects hereinbefore set forth, together with many practical advantages, are successfully achieved. As various possible embodiments may be made of the mechanical features of the above invention, all without departing from the scope thereof, it is to be understood that all matter hereinbefore set forth or shown in the accompanying drawings is to be interpreted as illustrative, and not in a limiting sense.

We claim:
1. A brush and tree cutting attachment for tractors comprising a bulldozer plate adapted for mounting forwardly of a tractor at an angle with respect to the longitudinal axis thereof, a bottom cutting blade capable of cutting large trees secured to the lower edge of said bulldozer plate and extending forwardly therefrom, the outer edge of said blade being sharpened and substantially parallel to said bulldozer plate for a major portion of its length and curving outwardly therefrom at the leading end of said blade to a point, and a side cutting blade of comparable strength and rigidity secured to the leading side of said bulldozer plate and extending forwardly therefrom in the direction of the longitudinal axis of said tractor, the outer edge of said side cutting blade being sharpened and sloping downwardly and outwardly to merge into the forward point of said bottom cutting blade.

2. An attachment as defined in claim 1, wherein the forward side edge of said bottom cutting blade and the bottom edge of said side cutting blade meet and are welded together.

3. An attachment as defined in claim 1, wherein the outer edge of said bottom cutting blade is sharpened by a bevel on the upper side thereof, and the outer edge of said side cutting blade is sharpened by a bevel on the inner side thereof.

4. A brush and tree cutting attachment for tractors comprising a bulldozer plate adapted for mounting forwardly of a tractor at an angle with respect to the longitudinal axis thereof, a backing plate secured to the lower forward face of said bulldozer plate and extending the length thereof, a bottom cutting blade capable of cutting large trees secured to the lower edge of said backing plate and extending forwardly therefrom at an obtuse angle, the outer edge of said blade being sharpened and substantially parallel to said backing plate for a major portion of its length and curving outwardly therefrom at the leading end of said blade to a point, a curved reinforcing plate positioned between said backing plate and said blade and welded to both, and a side cutting blade of comparable strength and rigidity secured to the leading side of said bulldozer plate and extending forwardly therefrom in the direction of the longitudinal axis of said tractor, the outer edge of said side cutting blade being sharpened and sloping downwardly and outwardly to merge into the forward point of said bottom cutting blade.

5. An attachment as defined in claim 4, wherein said side cutting blade is welded to said bulldozer plate and to said bottom cutting blade.

6. An attachment as defined in claim 5, wherein said side cutting blade is welded also to said backing plate and to said reinforcing plate.

References Cited in the file of this patent

UNITED STATES PATENTS

| | | |
|---|---|---|
| 956,768 | Jauer | May 3, 1910 |
| 1,698,809 | Angell | Jan. 15, 1929 |
| 2,295,458 | Edwards | Sept. 8, 1942 |
| 2,633,164 | Kissner et al. | Mar. 31, 1953 |